United States Patent [19]

Lane

[11] 4,225,242

[45] Sep. 30, 1980

[54] FOUR COLOR TOMATO GRADER

[75] Inventor: Marvin M. Lane, Arlington, Va.

[73] Assignee: Sortex North America, Inc., Sacramento, Calif.

[21] Appl. No.: 876,084

[22] Filed: Feb. 8, 1978 (Under 37 CFR 1.47)

[51] Int. Cl.² .......................... G01J 3/46; B07C 5/342; G01J 3/50

[52] U.S. Cl. ..................................... 356/407; 250/226; 209/558; 209/577

[58] Field of Search ........................ 356/407, 402, 425; 250/226, 209; 209/577, 580, 581, 582, 555, 558

[56] References Cited

U.S. PATENT DOCUMENTS 4,105,123 8/1978 Irving et al. .................... 356/407 X

*Primary Examiner*—John K. Corbin
*Assistant Examiner*—Rodney B. Bovernick
*Attorney, Agent, or Firm*—Cushman, Darby & Cushman

[57] ABSTRACT

A produce grading system that detects the light reflectances from an object in four color bands. Two bands are in the visible range and two are in the invisible range. By means of comparing various color combinations the system looks for the presence of a desired color, an undesired color, and determines if the object is vegetable or nonvegetable matter.

1 Claim, 5 Drawing Figures

FOUR COLOR TOMATO GRADER

BACKGROUND OF THE INVENTION

The harvesting of process tomatoes is done almost exclusively with mechanical harvesting machines in the state of California where the vast majority of U.S. process tomatoes are grown. The mechanical tomato harvesting process involves mechanically digging up the tomato plants, transferring them to a shaker and mechanically shaking the tomatoes from the vines. Consequently, a large number of green tomatoes, dirt clods and rocks are collected along with acceptable tomatoes.

Tomato processing plants that receive the harvested tomatoes from the fields and the California Department of Agriculture have established inspection standards that process tomatoes must meet. To determine if tomatoes delivered to a processing plant meet the established standards, random samples are taken from each load of tomatoes delivered. The samples are inspected to be sure that the load does not contain excessive numbers of green tomatoes, dirt clods, rocks, defects and other extraneous material. It is therefore necessary to sort the rejects from the good tomatoes during harvesting in the field in order to guarantee that each load of tomatoes delivered to a processing plant meets or exceeds inspection standards. This makes it necessary to do a high volume sorting operation while harvesting since harvesters operate at an average rate of 25 tons of tomatoes per hour. The sorting of process tomatoes in the last few years has been done more and more by the use of high volume electronic sorting apparatus mounted directly on the harvester.

The basic principal of operation for the electronic sorting machines is to drop the tomatoes to be inspected off the end of a feed conveyor that is on the harvester. Just after the objects leave the feed conveyor, they are illuminated and inspected in flight by an electro-optical device which looks at certain spectral wavelengths of reflected light and rapidly makes a decision to either keep or reject the inspected tomatoes and other objects. The flow of inspected tomatoes and other objects off the conveyor passes in front of a reject mechanism which can be extended so as to divert the trajectory of unacceptable objects over a dividing baffle and through a chute to the ground. Acceptable tomatoes go to a further conveyor for loading onto a truck.

One commonly used method for sorting tomatoes is to measure the red and green reflectance of the tomato and to compare one color signal with the other. When the green signal exceeds the red signal, the color is classified as green. When the red signal exceeds the green signal, the color is classified as red. This test gives a very reliable red/green sort most of the time. However, in the northern parts of California where the majority of process tomatoes are grown, there is a significant percentage of dark green tomatoes which have very low red and green spectral reflectances in the range of 10%. These tomatoes give relatively low sorting signals as well as very small voltage differences between red and green color signals. This leads to uncertainty and frequent misgrading of green tomatoes.

An improved electronic sorting method is disclosed in U.S. patent application 765,716, filed Feb. 4, 1977 by J. R. Sherwood, now U.S. Pat. No. 4,095,696, issued June 20, 1978. This method involves measuring the red reflectance of a tomato and comparing the red color signal with a reference signal $IR_1$ in the near infra red range at 800 nanometers (nm) to get a relative measurement of red content of each tomato. That is, if the red signal exceeds the $IR_1$ signal (800 nm) the color will be classified as red, and if the $IR_1$ signal exceeds the red signal, the color is classified as green. The sorting system of the above-mentioned Sherwood application also includes means for distinguishing between vegetable matter and nonvegetable matter. This test allows the system to detect dirt clods and rocks. The system detects non-vegetable matter by comparing the reference $IR_1$ signal at 800 nm with a second infra red signal $IR_2$ in the near infra red region at 990 nm. Tomatoes cause a dip in light reflectance around 990 nm while dirt clods and rocks do not. By comparing the $IR_1$ and $IR_2$ signals, the presence of rocks and dirt clods may be detected. That system also compared one of the infra red signals against a bias signal to detect the presence of an object at the inspection position.

The above-described red/800 nm color test is extremely effective for sorting out dark green tomatoes because of their characteristic of having relatively low green spectral reflectance compared to their 800 nm $IR_1$ reflectance. However, this method has the shortcoming that whitish type green tomatoes have very high spectral reflectance of around 80% in the visible spectrum, especially in the red and green spectral regions. Unfortunately, reflectance of the whitish-green tomatoes in the 800 nm band does not increase proportionately. This means that whitish-green tomatoes give red/800 nm reflectance ratios that approach those of acceptable tomatoes. This results in occasional misgrading of whitish-green tomatoes.

A whitish-green tomato is one that has at least a spot of whitish coloring on its skin and which usually is too immature to be acceptable.

SUMMARY OF THE INVENTION

The above problem is overcome in the tomato sorter of this invention by adding a red/green color comparison or a green/800 nm band comparison to the comparisons utilized in the above-mentioned Sherwood application. The purpose of the added comparison is to pick out tomatoes that have a relatively high green to red or green to 800 nm ratio like that of the whitish green tomato, and to OR the result of a selected one of the comparisons with the result of the red/800 nm comparison. Therefore, any whitish green tomatoes passing the red/800 nm test will be rejected by the selected red/-green or green/800 nm test. It becomes apparent that by using two color test simultaneously, a more reliable recognition of green tomatoes can be achieved.

Thus, there are two grading schemes which can be implemented for accurately removing green tomatoes. Both schemes utilize two color test as opposed to just one.

The sorting system of this invention allows the machine operator to program the sorter to use either one of the two previously described dual color comparison methods. The reasons for providing both methods of color grading are as follows. First, the method utilizing the red/green comparison and red/800 nm comparison can be programmed in the field so that multicolored tomatoes can be graded out in similar fashion to grading by a human sorter since the eye basically keys on the red to green color ratio. Secondly, the system utilizing the red/800 nm comparison and green/800 nm comparison grades essentially by taking a red measurement of each tomato inspected. However, this system does not grade color levels similar to the human eye when programmed in the field, but does give color ratio advantages when grading near the breaker region of multicolored tomatoes.

BRIEF DESCRIPTION OF THE DRAWINGS

The present invention will be described by referring to the accompanying drawings wherein.

DETAILED DESCRIPTION OF PREFERRED EMBODIMENT

The invention will be described in connection with sorting tomatoes according to their colors. It is to be understood that other articles of fruits or vegetables, and tobacco leaves, for example, could be sorted in accordance with their colors by selecting proper light sources, filters and optical detectors, as required.

Figure 1:
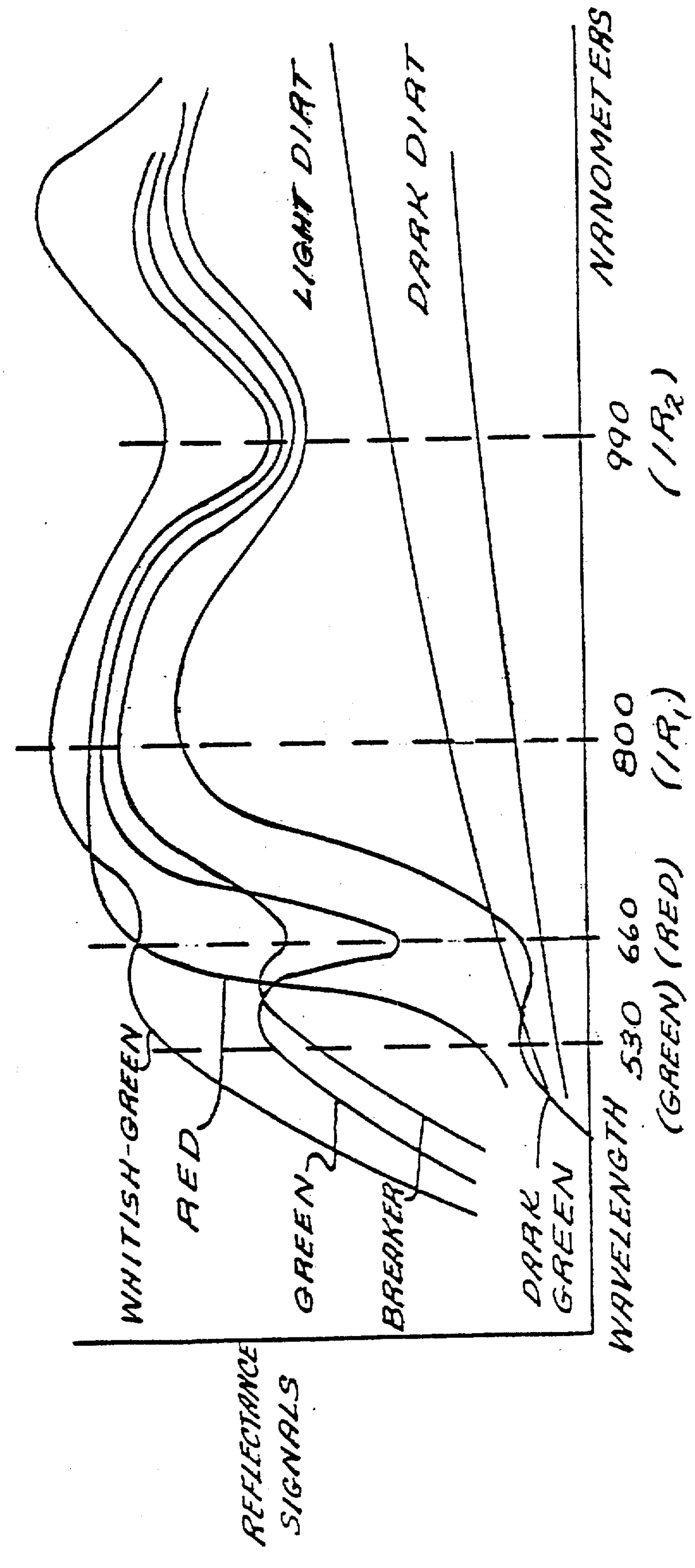
FIG. 1 is a series of curves illustrating the reflectance values of various colors of tomatoes as a function of the wavelength of the reflected light.

It is believed that the significance of the present invention will be better understood if the light reflectance of tomatoes and dirt are first investigated. FIG. 1 is a graphical representation of the light reflectance of red, green, dark green, whitish-green and multicolor or "breaker" tomatoes, and of light and dark colored dirt as a function of light wavelengths that includes the visible spectrum as well as the near infra red. Looking first at 660 nanometers (nm), it is seen that a red tomato has a strong reflectance and that a breaker tomato has a moderate reflectance, but a green tomato experiences a dip and has a significantly lower reflectance. It also is seen that all types of tomatoes have rather large values of reflectance in the near infra red region of 800 nm. All types of tomatoes suffer a dip in their reflectance curves in the near infra red region of 990 nm. This dip is the so called "water dip" that is characteristic of many fruits and vegetables. This term "water dip" actually is a misnomer since water alone and wet dirt, for example, do not exhibit a dip at 990 nm.

The above-mentioned "breaker" tomatoes are green but have a definite break in color to tannish-yellow, pink or red on their outsides but often are adequately mature and red on the inside. Breaker tomatoes often can be considered desirable and may be accepted along with red tomatoes. Consequently, a good tomato sorter will have a high degree of breaker color resolution with a selectable threshold.

Looking now at the two curves for dark and light dirt, it is seen that each increases with a respective substantially constant slope as a function of increasing wavelength, i.e., each is a monotonic function of light wavelength. Neither curve experiences a dip in the region of 990 nm.

In the above-mentioned Sherwood application red reflectance signals at 660 nm were compared with infra red reflectance signals at 880 nm to distinguish red from green tomatoes. The large difference in the magnitudes of the reflectance signals of red and green tomatoes as those two wavelengths produced good sorting results. The reflectance curve for a dark green tomato is quite low at 660 nm relative to that of a red tomato and does not significantly differ from a red tomato at 800 nm. Consequently, a comparison of the reflectance signals at those wavelengths also will result in a comparator circuit being able to reliably distinguish between red and dark green tomatoes.

Looking at the reflectance curve of a whitish-green tomato at 660 nm and 800 nm it is seen that the reflectance values do not significantly differ from those of a red tomato. Consequently, a comparison of the reflectance signals corresponding to those two wavelengths is not successful to reliably distinguish whitish-green tomatoes from red tomatoes.

Looking at the reflectance curves of a red tomato and a whitish-green tomato at 530 nm it is seen that there is a large difference between their reflectance values. This difference is much greater than the difference in magnitudes of the same curves at 800 nm. Consequently, by comparing the 530 nm and 800 nm reflectance signals in an electronic comparator, whitish-green tomatoes may be reliably distinguished from red tomatoes.

Looking at the reflectance curves of a red tomato and a whitish-green tomato at 530 nm and 660 nm it is seen that the two curves have greatly different values at 530 nm but very little difference at 660 nm. Therefore, by comparing reflected color component signals at 530 and 660 nm whitish-green tomatoes may be easily distinguished from red tomatoes.

In view of the above information it is seen that whitish-green tomatoes may be separated from the desirable red and/or breaker tomatoes by adding a 530/660 nm or a 530/800 nm color comparison to the 660/800 nm color comparison of the above-mentioned Sherwood application. The resulting color grader is extremely versatile and flexible for grading most varieties and conditions of tomatoes.

The addition of the 530/800 nm or green/$IR_1$ comparison is the subject of my present invention.

Figure 2:
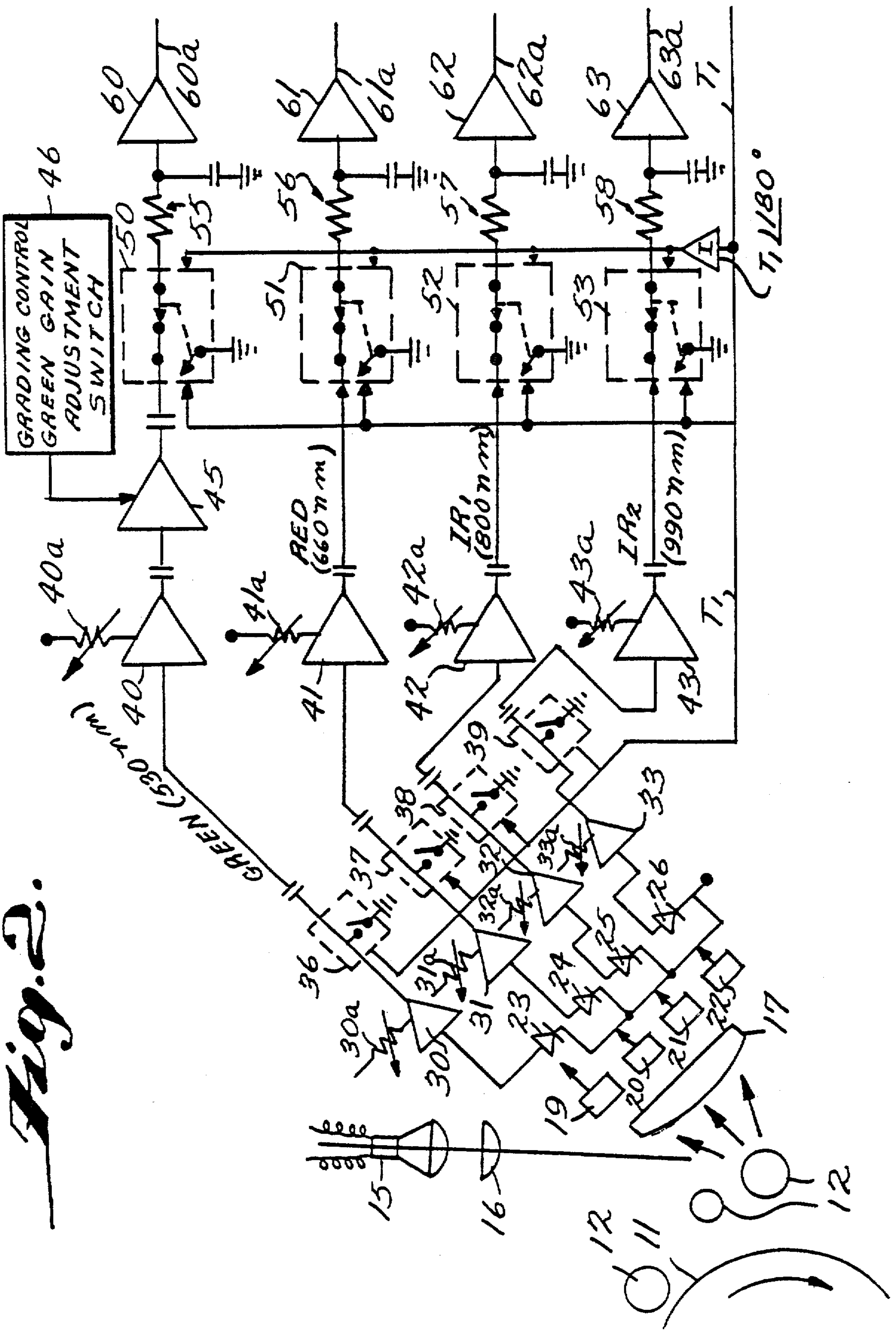
FIG. 2 is a simplified illustration of the electro-optical color signal producing portion of a produce color grader.

Referring now to the sorting system of this invention, FIG. 2 is a simplified illustration of the electro-optical portion of the system that is located at an inspection position on a harvester. A continuous conveyor belt 11 carries the articles of produce such as tomatoes 12 in a single file to the end of the conveyor where the articles are discharged in a free fall path. A light source 15, such as one or more tungsten lamps and a hemispherical bar lens 16, produce a narrow beam of collimated light that illuminates the discharged tomatoes. Light reflected from a tomato passes through a lens system 17 that distributes the reflected light onto four color filters 19, 20, 21, and 22. The filters have pass bands approximately 30 nm wide respectively centered at approximately 530 nm, 660 nm, 800 nm, and 990 nm. Positioned immediately behind the filters and illuminated by the respective light components passing through them are photodetectors 23, 24, 25, and 26. In practice, detectors 23, 24, 25, and 26 may be photodiodes operated in the short circuit mode. Type 21D81 photodiodes, sold by Vac Tec Inc., Maryland Heights, Mo., are satisfactory.

The outputs of the photodetectors are coupled to respective d.c. amplifiers 30, 31, 32, and 33. The amplifiers have respective variable resistors 30*a*, 31*a*, 32*a*, and 33*a* which are used to null the output signals of the amplifier during initial adjustment and calibration of the apparatus.

The optical system and electro-optical detecting apparatus described thus far may be the type described in detail in U.S. Pat. No. 3,981,590 issued Sept. 21, 1976 to J. R. Perkins, or the improved apparatus described in a patent application entitled, "Improved Optical System For Use With Color Sorter Or Grader," Ser. No. 874,169, filed Feb. 1, 1978, by J. R. Perkins, now U.S. Pat. No. 4,150,287, issued Apr. 17, 1979. In the improved system of Perkins, an objective lens focuses an image of the object onto the end of a fiber optic bundle where a field stop restricts the field of view to a strip 0.5 inch by 1.5 inch. The light that strikes the fiber optic bundle is transmitted through it and emerges at the other end in a conical pattern that illuminates all of the filters 19-22.

On a commercial tomato sorter, belt 11 may have as many as eight or more successions of tomatoes moving in parallel along the conveyor. For simplicity, the present discussion is limited to a single succession of tomatoes moving along conveyor belt 11 and to a single color sorter electronic signal channel. (A channel includes four signal lines, one for each monitored light component). In practice, each aligned succession of tomatoes will have associated with it an electro-optical inspection head, a color sorter electronic channel, and an article ejection means.

In FIG. 2, the outputs of d.c. amplifiers 30-33, are coupled to respective electronic choppers 36, 37, 38, and 39 where the signals are converted to alternating current signals that are more suitable for amplification. Choppers 36, 37, 38, and 39 are in fact FET electronic switches that operate in response to a square wave gating signal T1 at a frequency of 710 Hz, for example, to repeatedly ground the outputs of the d.c. amplifiers and thus produce the a.c. signals.

The four a.c. signals whose amplitudes correspond to the reflected light at 530 nm (green), 660 nm (red), 800 nm ($IR_1$), and 990 nm ($IR_2$) are capacitively coupled to respective a.c. amplifiers 40, 41, 42, and 43. Each amplifier has a respective calibration adjustment means 40*a*, 41*a*, 42*a*, and 43*a* associated with it to permit the signal lines to be calibrated prior to field operation. This calibration is performed while a standard color plate is held in front of the optic head.

Another a.c. amplifier 45 is in the green signal line. No corresponding amplifiers are in the red, $IR_1$ or $IR_2$ signal lines. The gain or amplifier 45 is programmable, or adjustable, in discrete, uniform steps by means of green gain adjust switch 46. This switch is a binary coded switch accessable to the operator. It is by means of this switch 46 that the operator of the sorter can determine the "cut point" of the color grading. That is, switch 46 sets the gain in the green signal line to cause all tomatoes more red than a selected color to be accepted and all tomatoes more green than that selected color to be rejected. Switch 46 is comprised of parallel connected binary weighted resistors (representing binary digits) connected in the feedback circuit of an operational amplifier. One end of each binary weighted resistor (binary digit) is connected to ground through an electronic switch which is opened and closed in response to a signal from a respective one of a plurality of binary coded thumbwheel switches. Selective operation of the binary coded thumbwheel switches closes corresponding switches associated with the binary weighted resistors to connect selected resistors to ground, thus changing the gain of the amplifier by a desired amount. In a sorter of this type, one binary switch controls the gains in all green signal channels in an identical manner, thus preserving calibration of the apparatus. The above-mentioned Sherwood U.S. Pat. No. 3,944,819 shows other gain control means comprised of binary coded thumbwheel switches that control the gains in all signal channels by the same amount. .

The four a.c. signals from a.c. amplifiers 45, 41, 42, and 43 are converted back to d.c. signals by means of respective electronic synchronous demodulators or detectors 50, 51, 52, and 53 and integrating circuits 55, 56, 57, and 58. Each of the synchronous detectors is comprised of alternately operating shunt and series switches that operate in response to gating signals T1 and T1/180°. The switches are in fact commercially available electronic semiconductor switches of known type.

Integrators 55-58 are coupled to low pass filter and buffer amplifiers 60, 61, 62, and 63 whose d.c. output signals on lines 60*a*, 61*a*, 62*a*, and 63*a* correspond to the amount of green light at 530 nm, red light at 660 nm, infra red light at 800 nm, and a second infra red light at 990 nm, respectively, that are reflected from an article being inspected.

The manner in which these signals are operated on to sort green tomatoes, dirt clods, and rocks from acceptable red tomatoes will be discussed in connection with the simplified circuit logic diagram of FIG. 3.

Figure 3:
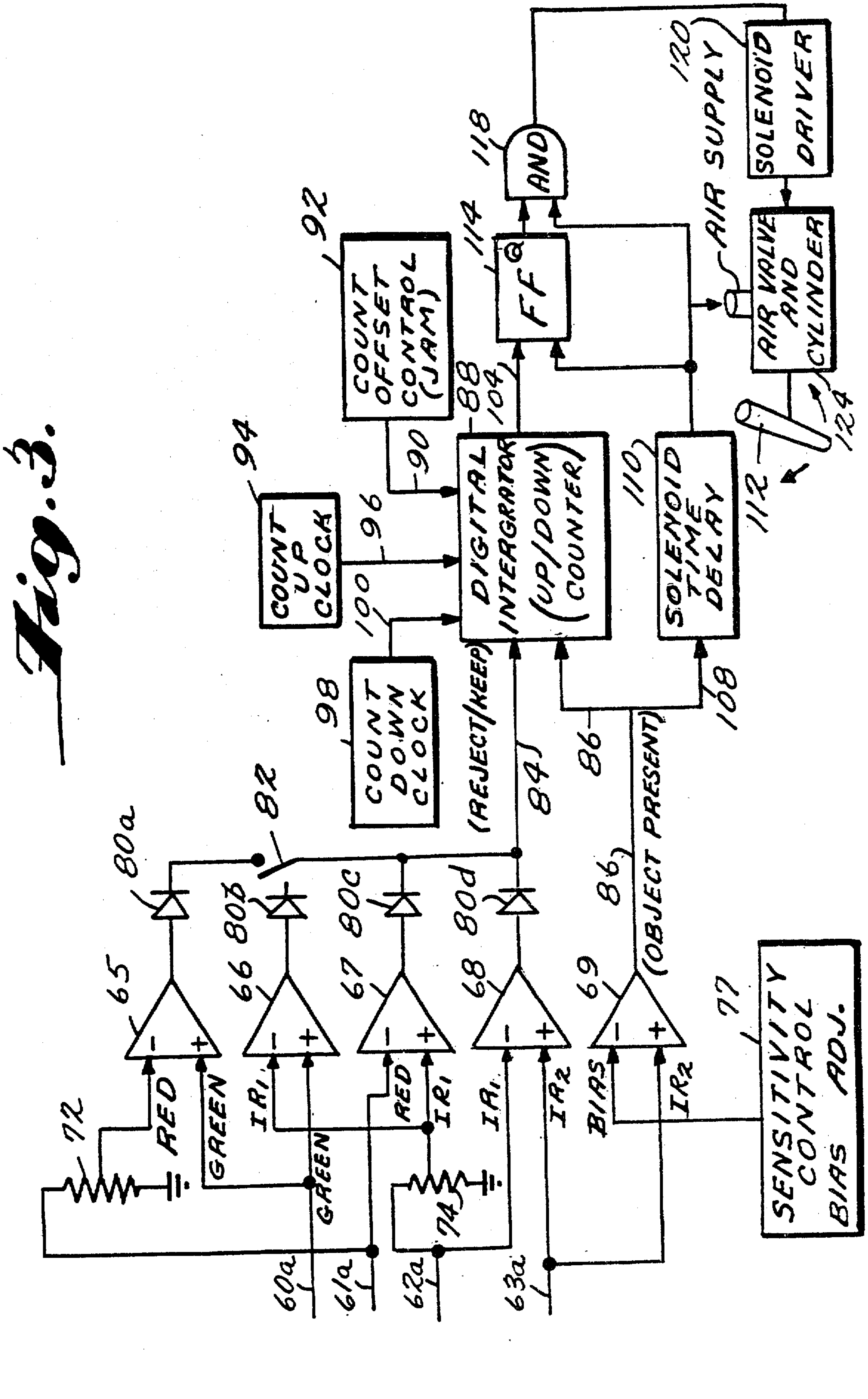
FIG. 3 is a simplified block diagram of the logic of a color grader that accepts the color signals from the portion of the system illustrated in FIG. 2 and produces reject signals that causes unacceptable produce to be sorted from acceptable produce.

The d.c. signals on lines 60*a*-63*a* at the right edge of FIG. 2 are the input signals on the same lines 60*a*-63*a* at the left in FIG. 3. These signals are coupled either directly or by way of a resistor divider to one or more of the five comparator circuits 65, 66, 67, 68, 69. The comparators all function the same to produce a high level output signal when the positive input signal exceeds the negative input signal. The output signal of a comparator is low when the magnitude of the negative input signal exceeds that of the positive input signal. Except for comparator 69, a high output signal represents reject data, as will be explained more fully below.

The negative input signal to comparator 65 is the red signal (660 nm) reduced 50% by voltage divider 72. The positive input to comparator 65 is the green signal (530 nm) at 100%. Consequently, a green/red color ratio slightly greater than 0.5 will cause comparator 65 to produce a high output signal indicating reject data. (It is assumed that the system has been properly calibrated using a white reference background plate.) Comparison of the red and green signals in comparator 65 is effective to reject all solid green colored tomatoes except for the dark green ones that have low reflectivity of both the red and green color components. Whitish-green tomatoes will cause comparator 65 to produce a high output indicating reject data.

The comparison of the red color component signal and the $IR_1$ (800 nm) reference signal in comparator 67 will produce an output signal indicating reject data when the red signal falls below the $IR_1$ signal that has been reduced to 40.5% by voltage divider 74. This comparison is effective to reject all solid green tomatoes, including dark green, but is not effective to reject whitish green tomatoes because they have a relatively high reflectance in the red band. The $IR_1$ signal has been reduced in magnitude so that it will be of proper magnitude relative to the green color component in a dark green tomato to cause comparator 67 to operate as desired.

The green component signal at 100% is coupled to the positive input of comparator 66 and compared with the reference $IR_1$ signal at 40.5%. If the green signal exceeds the $IR_1$ input signal the output goes high to provide reject data. This comparison is effective for indicating the presence of whitish green tomatoes. This same comparison can be programmed to remove multicolored tomatoes having a given percentage or ratio of red to green.

The $IR_1$ reference signal at 100% and the second near infra red signal $IR_2$ at 990 nm are compared in comparator 68. An output signal is produced if the $IR_2$ signal becomes higher in magnitude than the reference signal $IR_1$. This will happen in the presence of a rock or dirt clod since a tomato will cause the $IR_2$ signal to be low because of the above-discussed water dip. (Again it is assumed that the $IR_1$ and $IR_2$ signals have been calibrated to be equal in magnitude under normal operating conditions.

The last comparator 69 compares $IR_2$ signal at 990 nm with an adjustable bias voltage from a sensitivity control bias adjust source 77. The bias voltage is adjusted in magnitude so that comparator 69 produces a high output signal each time an object larger than some predetermined minimum size is in the field of view of the optic system.

Diodes 80*a*–80*d* comprise a logic OR circuit that couple a high magnitude signal to input conductor 84 when any one of the comparators 65–68 produces a high output signal.

A switch 82 is operable for selecting the output of either one of the comparators 65 or 66. That is, either the red/green or the green/$IR_1$ comparison may be selected by switch 82 for further processing by the apparatus of this invention.

As will be explained in more detail below, the remainder of the color grading logic circuitry will not function to evaluate or analyze input color signals unless comparator 69 produces an output signal of high magnitude on lead 86. This output signal indicates than an object of at least a minimum size is in the field of view of the optical system. A high output signal on lead 86 of object sensing comparator 69 is an enable signal that turns on digital integrator 88, which in fact is an up/down counter. In the absence of a high or "ENABLE" signal from object sensing comparator 69, the up/down counter 88 is held in a reset condition and a predetermined count is entered into the counter on lead 90 from count offset control means 92.

The other control input to up/down counter 88 is the OR gate output on lead 84 from comparators 65–68. In the presence of an enable signal on input lead 86, a high signal on input lead 84 allows clock pulses from count up clock 94 to be coupled over lead 96 to increment, i.e., increase, the count then in up/down counter 88. In the presence of an enable signal on lead 86, a low signal on the input lead 84 causes clock pulses from adjustable frequency count down clock 98 to be coupled over lead 100 into up/down counter 88 to cause the counter to count down from the count then in counter.

The count down clock 98 is adjustable or programmable by means of a binary coded switch to provide any one of 16 different pulse frequencies that range from one fourth to four times the pulse frequency of the count up clock 94. The programmable count down clock 98 allows the operator to either expand or contract, i.e., weight, the apparent size of red spots on tomatoes.

When up/down counter 88 counts up to a predetermined count in response to a high (reject) signal on input lead 84 and a high signal on lead 86 from object sensing comparator 69, a high output (reject signal) is produced on output lead 104. If the input on lead 84 should go from high to low before the predetermined count is reached in up/down counter 88, counting will reverse and the count will decrease at the rate chosen for adjustable count down clock 98.

The output signal from object sensing comparator 69 also is coupled on line 108 as the input to solenoid time delay circuit 110. This circuit produces a time delay of the object sense signal that corresponds to the time required for an object at the inspection position to move to a position in front of the reject paddle 112 at the end of conveyor 11, FIG. 2.

When up/down counter 88 produces a reject output signal on lead 104 and a delayed object sense signal is coupled from time delay circuit 110 as an input signal to flip flop circuit 114, the Q output of the flip flop goes high to transfer the reject signal to one input of AND gate 118. The simultaneous occurrence at AND gate 118 of a reject signal and the time delayed object sense signal from time delay circuit 110 causes the reject signal to pass through the gate and activate solenoid driver circuit 120 which in turn energizes a solenoid that operates an air valve and cylinder 124 that causes object reject paddle 112 to be extended into the path of a free falling object to deflect it into a discharge path.

Figure 4:
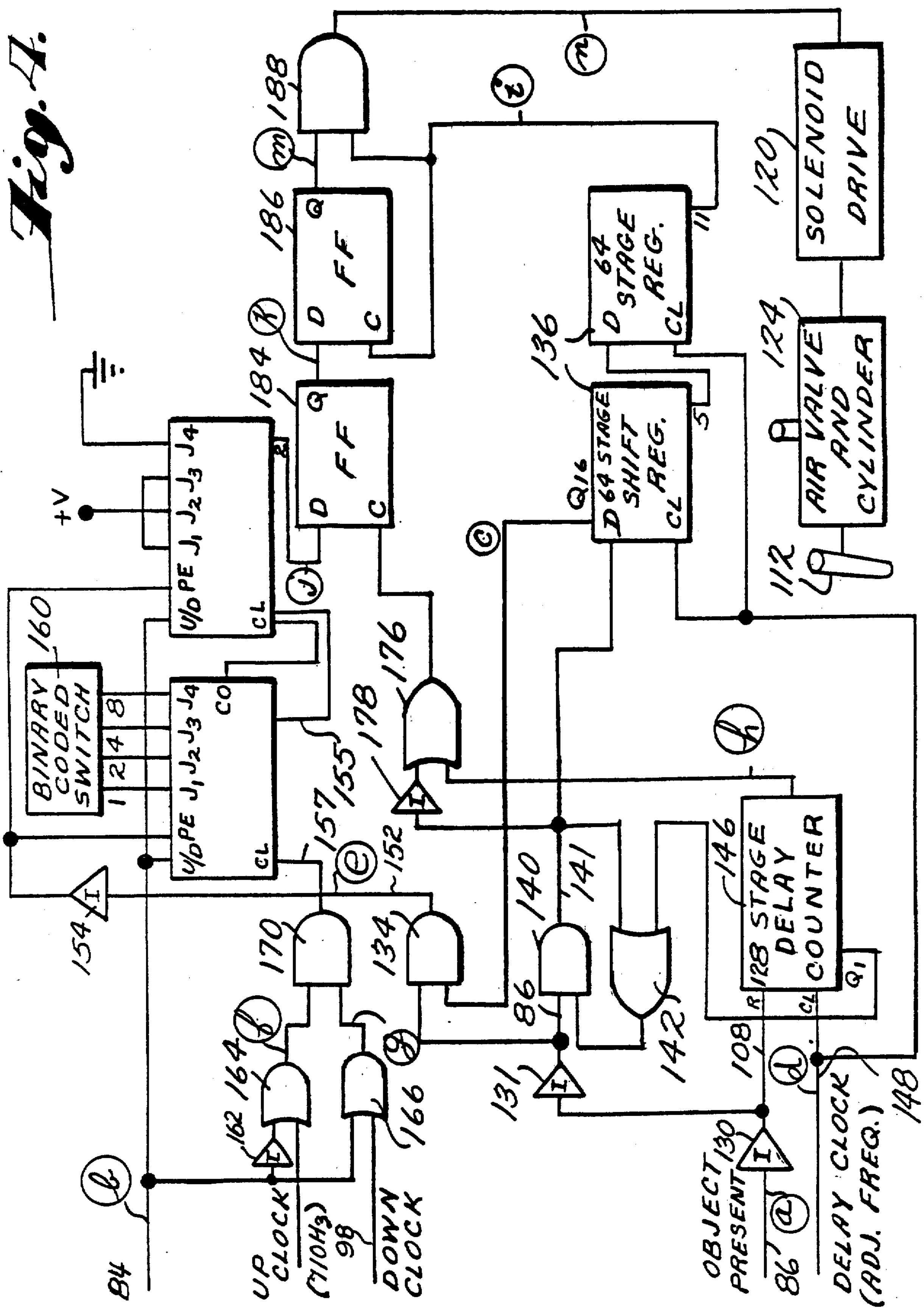
FIG. 4 is a simplified circuit diagram of a part of the logic system illustrated in FIG. 3.

A more detailed explanation of the logic portion of the color grader of this invention is illustrated in FIG. 4. It was mentioned above that the color grading logic circuitry will not function to evaluate or analyze input color signals unless comparator 69, FIG. 3, produces a high output signal on lead 86. This high signal indicates than an object has been sensed at the inspection position.

In FIG. 4, the high Object Present signal (FIG. 5*a*) on lead 86 is coupled through inverter 130, and through a second inverter 131, and is applied as a high signal to one input of AND gate 134. The other input signal to AND gate 134 is a delayed signal from the $Q_{16}$ output (FIG. 5*c*) of a 128 stage shift register 136 (comprised of two 64 stage shift registers in tandem). The delayed output $Q_{16}$ is derived as follows.

The object present high signal on lead 86 is coupled as one input to AND gate 140. The other input to AND gate 140 is the output of OR gate 142 which has one input from the $Q_1$ output of a 128 stage counter 146. Counter 146 may be compared generally to Solenoid Time Delay 110 of FIG. 3. The inverted object present signal on lead 108 is one input to counter 146 and releases the reset of the counter. Delay Clock Pulses at a rate of approximately 3.78 kHz for example (FIG. 5*d*), are coupled on lead 148 to the other input of counter 146. The negative going edges of the delayed clock pulses cause the counter 146 to accumulate a count therein. When the count reaches the first stage, the $Q_1$ output goes high and the high signal is coupled through OR gate 142 to the lower input of AND gate 140. Both inputs of AND gate 140 now are high and the output on lead 141 goes high. This high signal is coupled as the second input to OR gate 142, and thus maintains, or latches, a high signal on the lower input terminal of AND gate 140. Therefore, output lead 141 will remain high so long as an Object Present signal is present on input lead 86.

Figure 5:
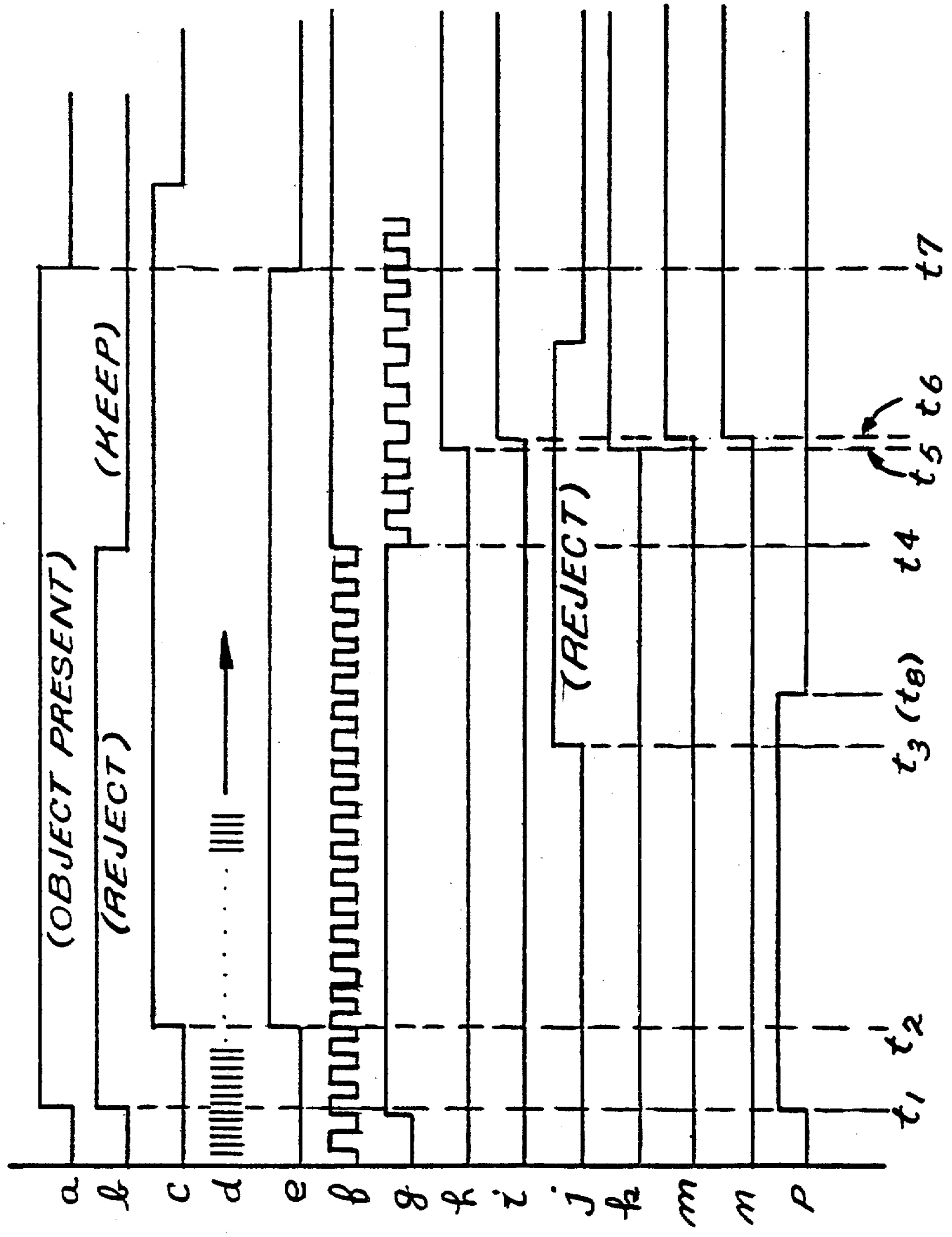
FIG. 5 is a series of simplified waveforms representing voltage or current waveforms that occur at various places in the circuit diagram of FIG. 4.

The high signal on output lead 141 is coupled to the D input of 128 stage shift register 136. The clock input to register 136 is the delayed clock pulses (FIG. 5_d_) on lead 148. The positive going edges of the delayed clock pulses clock the Object Present signal (FIG. 5_a_) through shift register 136. When the Object Present signal has been shifted through approximately one-eighth of the stages of register 136, the $Q_{16}$ output goes high (FIG. 5_c_) and causes the lower input terminal of AND gate 134 to go high. The upper input of AND gate 134 already is high because of the Object Present signal passing through inverters 130 and 131, so the output lead 152 of AND gate 134 goes high (FIG. 5_e_). This signal is inverted to a low lever in inverter 154 and is coupled in parallel to the preset enable (PE) inputs of Up/Down COUNTER 155. Counter 155 is comprised of two individual counters coupled in tandem. The low signals to the PE inputs of the two counter halves enables the counter halves and allows them to count up or down depending on whether the input to the up/down (U/D) terminals is high or low, respectively.

The input signal to the U/D terminals of Up/Down counter 155 is the reject or keep logic signal on lead 84 (FIG. 5_b_). When a reject (high) signal is on input lead 84, counter 155 is conditioned to count up and when a keep (low) signal is on input lead 84 counter 155 is conditioned to count down.

During the time that the present enable (PE) input signal initially was high, Up/Down counter 155 had some selectable count initially set into its first section by way of the jam inputs $J_1$–$J_4$ that are coupled to the respective binary weighted output terminals of a binary coded thumbwheel switch 160. The jam inputs $J_1$–$J_4$ of the second section of counter 155 are coupled to fixed bias voltages, and thus the second section of counter 155 is not programmable as the first section is.

Either an up clock input 94 or a selectable frequency or a down clock input 98 may be coupled to the clock input 157 of Up/Down counter 155 depending on whether the signal on input terminal 84 indicates that an article of produce is to be rejected or kept.

The reject signal of FIG. 5_b_, after inversion in inverter 162, is coupled as a low signal to one input to OR gate 164. The other input signal to gate 164 is the count up clock pulses at 710 Hz on lead 94. Because the top input to OR gate is the inverted reject signal of FIG. 5_b_, the upper input terminal of OR gate initially will be low. Consequently, the output of OR gate 164 initially will be a series of count up pulses, see FIG. 5F. In the example assumed, the reject or keep signal of FIG. 5_b_ later goes low. Consequently, after inversion in inverter 162 the top input of OR gate 164 goes high and remains high. The output of OR gate 164 (FIG. 5_f_) therefore goes high and remains high.

The reject or keep signal of FIG. 5_b_ is coupled without inversion to the top input of OR gate 166 and the count down clock pulses on lead 98 are coupled to the second input. Because the reject signal of FIG. 5_b_ initially is high, the output of OR gate 166 initially is high and remains there, despite the fact that count down pulses are appearing at the other input. See FIG. 5_g_. When the signal on lead 84 changes from a reject to a keep signal, FIG. 5_b_, the top input to OR gate 166 goes low and the output thereof follows the count up clock pulses on the other input, as illustrated by the waveform of FIG. 5_g_. The output signals of OR gates 164 and 166 (FIGS. 5_f_ and 5_g_) are the two input signals to AND gate 170. Looking at those two waveforms reveals that one or the other of the count up or count down pulse trains always will be coupled from the output of AND gate 170 to the input 157 of Up/Down counter 155.

It should be kept in mind that the reject or keep signal on lead 84 also controls the direction of counting in Up/Down counter 155. Therefore, each time the signals of FIGS. 5_f_ or 5_g_ changes from a steady state level to a pulsed signal, counter 155 is conditioned to change so that it counts up for the pulses of FIG. 5_f_ and counts down for the pulses of FIG. 5_g_.

It should be kept in mind that Up/Down counter is not enabled to count until the output signal of AND gate 134 went high, FIG. 5_e_. Therefore, even though the pulses of FIGS. 5_f_ and 5_g_ are coupled to the clock input of counter 155, actual counting will not begin until shift register 136 ($Q_{16}$) produces a fixed delay after an object is first sensed at the inspection position. This delay is the time period that occurs between the times that FIG. 5_a_ and FIG. 5_c_ go high. This delay assures that the optical system is "looking" at the body of a tomato and not just an edge, and allows transients to die out in the color signal channels.

In FIG. 5, an object is detected at time t1, see FIG. 5_a_. As indicated in FIG. 5_b_, the object produces reject information immediately after t1. Also explained above, the Object Present signal, FIG. 5_a_, is coupled through inverter 130 to unlock 128 stage delay counter 146 which immediately begins to count delay clock pulses at 3.78 kHz, FIG. 5_d_. The Object Present signal of FIG. 5_a_ also is coupled through inverters 130, 131, AND gate 140, to the D input of 128 stage shift register 130 through which it is shifted by delay clock pulses. Because a $Q_1$ output from delay counter 146 (one count) is required before AND gate 140 is turned on via OR gate 142, counter 146 is one count ahead of shift register 136. However, because delay counter 146 responds to the negative going edges of delay clock pulses and shift register 136 operates on the positive going edges or input delay clock pulses, shift register 136 actually trails counter 146 only by one interpulse period, or 33.8 m sec. in this example since a 50% duty cycle is assumed for delay clock pulses. During the time that delay counter 146 is counting up to 128 counts and during the time an Object Present signal is being shifted through shift register 136, the outputs of both devices are low, see FIGS. 5_h_ and 5_i_.

At time t2 the $Q_{16}$ output of shift register 136 goes high, FIG. 5_c_, and via AND gate 152 and inverter 154 the PE inputs of Up/Down counter 155 go low to permit counter 155 to commence counting up from its preset or jam count. Count up pulses, FIG. 5_f_, are counted up in counter 155.

At time t3 counter 155 reaches a predetermined reject count that constitutes a reject command, see FIG. 5_j_. This high signal is coupled to the D input of D-type flip flop 184. The C input of flip flop 184 is the output of OR gate 176. Because inverter 178 inverts the high output of AND gate 140 and the output of delay counter 146 still is low, FIG. 5_h_, OR gate 176 has a low output at time t3 and flip flop 184 remains in its first stable state in which its Q output is low, see FIG. 5_k_.

Both inputs to a second D-type flip flop 186 are low, FIGS. 5_i_ and 5_k_, so flip flop 186 is in its first stable state during which its Q output is low, FIG. 5_m_.

Up/Down counter 155 continues to count up beyond its predetermined reject count so long as the reject or keep signal on line 84, FIG. 5*b*, provides a reject (high) signal. This counting continues until time t4 at which time the signal on lead 84 provides keep data, FIG. 5*b*. OR gates 164, 166 and AND gate 170 operate as described above to cause the output of AND gate 170 to switch from count up pulses, FIG. 5*f*, to count down pulses, FIG. 5*g*. Counter 155 now commences to count down from its high count because the signal applied to its U/D inputs has changed.

Meanwhile delay counter 146 continues to accumulate counts at an assumed rate of 3.78 kHz until time period t5 at which time the delay counter 146 is full and its output goes high, FIG. 5*h*. This high signal passes through OR gate 176 and is coupled to the C input of flip flop 184 which then changes states, FIG. 5*k*, and causes the high signal on the D input to be transferred to the Q output.

Referring to FIG. 5*j*, it is seen that the count in Up/Down counter 155 remained above its predetermined reject count despite the fact that it was counting down during the time period t4–t5. This means that despite the fact that some red color was seen by the optical system it was not enough to make the tomato a "keeper."

Immediately after delay counter 146 reaches its full count, the leading edge of the Object Present signal is shifted to the output of shift register 136 and its output goes high at time t6, FIG. 5*i*.

Both inputs to the second flip flop 186 now are high and the positive going C input clock a high to the Q output, FIG. 5*m*. Both inputs to AND gate 188 now are high and its output goes high, FIG. 5*n*. Solenoid driver 120 then is energized to actuate the air valve and cylinder 124 which in turn moves paddle 112 into the path of the object to deflect it away from the path of the good tomatoes.

As soon as the Object Present signal, FIG. 5*a*, goes low on line 86, delay counter 146 is reset to zero count and the outputs of AND gates 134 and 140 go low. The low output of AND gate 140 is inverted in inverter 178 and a positive going signal is coupled to the clock input of flip flop 184.

Simultaneously, the low going output of AND gate 134 is inverted in inverter 154 and the preset enable (PE) inputs of Up/Down counter 155 go high and the counter begins to reset to its preset count as controlled by binary coded switch 160. The counter 155 is slow in resetting so that its output on pin 2, FIG. 5*j*, has not yet changed when the positive going signal from inverted 178 and OR gate 176. The Q output of flip flop 184 therefore remains high. There is no positive going clock at the clock input of flip flop 186 at this time so its Q output stays high. Consequently, both inputs to AND gate 188 remains high and its output stays high for the duration of the Object Present signal, FIG. 5*a*. This assures reliable operation of deflection paddle 112.

The use of two D-type flip flops 184 and 186 and the fact that the clock input, FIG. 5*i*, to the second flip flop is delayed relative to the clock input, FIG. 5*h*, of the first flip flop, means that flip flop 184 may store the reject or keep logic decision for an object that is presently in, or just leaving the field of view while flip flop 186 is storing a logic decision for an object that is approaching, or is already at, the location of reject paddle 112.

The frequency of the delay clock pulses on line 148 determine the delay periods of delay counter 146 and shift register 136. This delay clock frequency is variable to adjust exactly for the transit time of an object from the inspection position to the ejection position in front of paddle 112.

Binary coded switch 160 is a sixteen position switch which allows the operator to change the preset or jam count to which Up/Down counter 155 is set each time it is reset. This switch controls the number of count up (reject) clock pulses that must be counted before the predetermined reject count is reached. Therefore, if a higher count is jam loaded into Up/Down counter 155 a smaller object can produce enough pulses of reject data to cause a reject signal to be produced at the output of the counter. Thus, binary coded switch 160 is a means for varying the size of objects that will pass through the grader without causing the system to respond.

The above example of the operation of the logic circuitry of FIG. 5 assumed that the object being viewed was large enough that the Object Present signal of FIG. 5*a* lasted long enough that delay counter 146 could accumulate a full count of 128 delay clock pulses and that the leading edge of the Object Present signal of FIG. 5*a* could be shifted to the output of delay shift register 136, FIG. 5*i*, before the Object Present signal terminated at time t7. It was at time t5 that the logic circuitry made its decision to reject or keep the object being viewed. This decision depended on the output of Up/Down counter 155 at that time. It may happen that a small tomato may pass completely through the inspection position before delay counter 146 is filled.

Suppose that a small tomato passes through and is out of the field of view at time t8, see FIG. 5*p*. Delay counter 146 is not full so its output is low and the leading edge of the Object Present signal of FIG. 5*a* still is in shift register 136. Assuming that the object is a reject, Up/Down counter 155 will count up in the manner previously described until its predetermined reject output, FIG. 5*j*, goes high. As soon as the small tomato is out of the field of view the Object Present signal on lead 86 goes low, FIG. 5*p*, and the top input to AND gate 140 goes low. This low signal is inverted by inverter 178 and a positive going signal is present a1 the C input of D-type flip flop 184. This input clocks through the high on the D input and the Q output goes high. The Object Present signal of FIG. 5*a* continues to be shifted through shift register 136 by delay clock pulses and when the leading edge appears at the output and is present at the C input of the second flip flop 186, the high D input is transferred to the Q output. Both inputs to AND gate 188 now are high. The output of AND gate 188 goes high and energizes solenoid driver 120 and air valve and cylinder 124, thereby extending paddle 112 into the path of the object.

It may be that an object is multicolored. It may first cause the reject keep signal on lead 84 to be high (reject) so as to cause Up/Down counter 155 to count up beyond its predetermined reject count at which time its output, FIG. 5*i*, goes high. However, before a decision is made by the appearance of a positive going clock pulse at input C of flip flop 184, the data on lead 84 changes to keep data. Counting now reverses in Up/Down counter 155 and count down clock pulses reduce the total count in the counter. It may happen that the count down clock pulses reduce the total count in counter 155 below its predetermined reject count by the time a positive going signal appears at the clock input of flip flop 184. Consequently, the output of counter 155 is low at that time and the decision is made that the object is a "keeper." Therefore, it is seen that the decision to reject or keep may change either way while the object is being inspected.

The frequency of the count down clock pulses on lead 98 is variable and selectable by the operator. This allows the operator to weigh the influence that red spots will have on the decision to keep or reject. In practice this frequency may be changed from one-fourth to four times the frequency of the count up clock pulses on lead 94 (710 Hz).

In a preferred embodiment of the logic circuitry of FIG. 5, the device and components used had the following identification.

| | |
|---|---|
| Delay counter 146 | CD4040AF |
| Shift register 136 | MC14517CL |
| Flip flops 184, 186 | CD4013AF |
| Up/Down counter 155 | CD4029AF |
| AND gates 134, 140, 170, 188 | CD4081BF |
| OR gates 142, 164, 166, 176 | CD4071BF |
| Inverters 130, 131, 154, 162 | CD4069BF |

The specific wavelengths of colors used in the above description are representative of those successfully used. It should be understood that colors in the following bands may be useful in the practice of this invention.

| | |
|---|---|
| Green | 500–575 nm |
| Red | 600–700 nm |
| $IR_1$ | 725–850 nm |
| $IR_2$ | 930–1025 |

In its broader aspects, this invention is not limited to the specific embodiment illustrated and described. Various changes and modifications may be made without departing from the inventive principles herein disclosed.

I claim:

1. A method for sorting articles of a given produce according to a desired red color of that produce and for sorting undesired nonvegetable articles such as dirt clods and rocks from desired produce to be retained, comprising passing through an inspection position the given articles of produce to be sorted along with mingled dirt clods and rocks, illuminating the inspection position with light that includes a narrow band of visible green light substantially centered at approximately 530 nm, a narrow band of visible red light substantially centered at approximately 660 nm, and first and second narrow bands of invisible light respectively centered at approximately 800 nm and 990 nm, receiving light reflected from articles passing through the inspection position, producing first, second, third and fourth signals corresponding, respectively, to the amount of light that exceeds predetermined amounts of light in said 530, 660, 800 and 990 nm bands, detecting the presence of an article at the inspection position, comparing the first and third signals to determine if a detected article has an undesired amount of green color, comparing the second and third signals to determine if an acceptable amount of red color is present in detected articles, including dark green articles, comparing the third and fourth signals to determine if a detected object is vegetable or nonvegetable matter.

* * * * *